United States Patent
Roden

(10) Patent No.: US 9,378,289 B2
(45) Date of Patent: Jun. 28, 2016

(54) TRANSLATING SEARCH STRINGS INTO PHYSICAL LOCATIONS

(75) Inventor: Barbara Roden, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1633 days.

(21) Appl. No.: 12/165,740

(22) Filed: Jul. 1, 2008

(65) Prior Publication Data

US 2010/0005076 A1  Jan. 7, 2010

(51) Int. Cl.
G06F 12/00 (2006.01)
G06F 15/16 (2006.01)
G06F 17/30 (2006.01)
G06F 13/14 (2006.01)

(52) U.S. Cl.
CPC ................... G06F 17/3087 (2013.01)

(58) Field of Classification Search
CPC .................................................. G06F 17/3087
USPC .................... 707/999.002–999.005, 999.104, 707/999.107, 999.2, 999.102, 695, 769, 707/E17.014; 455/414.1, 414.3, 405, 418, 455/432.3, 439, 445, 456.1, 456.3, 558; 704/2, 3, 270; 701/200–211; 708/109; 709/220
See application file for complete search history.

(56) References Cited

U.S. PATENT DOCUMENTS

| | | | | |
|---|---|---|---|---|
| 6,680,694 | B1* | 1/2004 | Knockeart | G01C 21/3415 342/357.31 |
| 6,823,257 | B2* | 11/2004 | Clapper | G01C 21/34 342/357.76 |
| 6,850,934 | B2* | 2/2005 | Bates et al. | |
| 7,205,890 | B2* | 4/2007 | Defant | B60R 25/2018 340/539.11 |
| 2006/0293083 | A1* | 12/2006 | Bowen | 455/558 |
| 2008/0215202 | A1* | 9/2008 | Breed | G01C 21/3611 701/25 |

* cited by examiner

*Primary Examiner* — Usmaan Saeed
*Assistant Examiner* — Cecile Vo
(74) *Attorney, Agent, or Firm* — Hartman & Citrin LLC

(57) ABSTRACT

This description provides tools and techniques for translating search strings into physical locations. These tools may provide methods that include retrieving search strings, and requesting translation of the search strings to one or more corresponding physical locations. These methods may also receive representations of the corresponding physical locations, and provide the representations of the physical locations as input to a navigation engine.

21 Claims, 4 Drawing Sheets

TRANSLATING SEARCH STRINGS INTO PHYSICAL LOCATIONS

BACKGROUND

Navigation devices and systems that interact with global positioning systems (GPSs) are increasingly being adopted by consumers, as their costs continue to decrease and more features become available. Usually, such navigation devices or systems receive as input some representation of a designated destination, whether described as a physical location, a street address, a point of interest, or the like. Typically, users of these navigation devices input desired destinations through manual interactions with the devices. For example, a user might wish to receive directions to a given street address, which may be expressed as a city, state, street name, and street number. A number of different approaches have been proposed for enabling users to enter the city, state, street name, and street number information. However, these approaches still involve repetitive manual actions to enter the various characters that constitute this address information. These manual actions may take some time to complete, and may frustrate some users.

With the advent and increasing development of speech recognition technology, some navigation devices and systems incorporate speech recognition capabilities. When operating such systems, users may issue commands and provide information by voice, rather than manual input. In some cases, speech recognition improves the overall user experience, but some users experience frustration with speech recognition systems.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This description provides tools and techniques for translating search strings into physical locations. According to various embodiments described herein, these tools may provide methods that include retrieving search strings, and requesting translation of the search strings to one or more corresponding physical locations. These methods may also receive representations of the corresponding physical locations, and provide these representations of the physical locations as input to a navigation engine.

Other apparatus, systems, methods, and/or computer program products according to embodiments will be or become apparent to one with skill in the art upon review of the following drawings and Detailed Description. It is intended that all such additional apparatus, systems, methods, and/or computer program products be included within this description, be within the scope of the claimed subject matter, and be protected by the accompanying claims.

DETAILED DESCRIPTION

The following detailed description is directed to methods, systems, and computer-readable media for translating search strings into physical locations. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
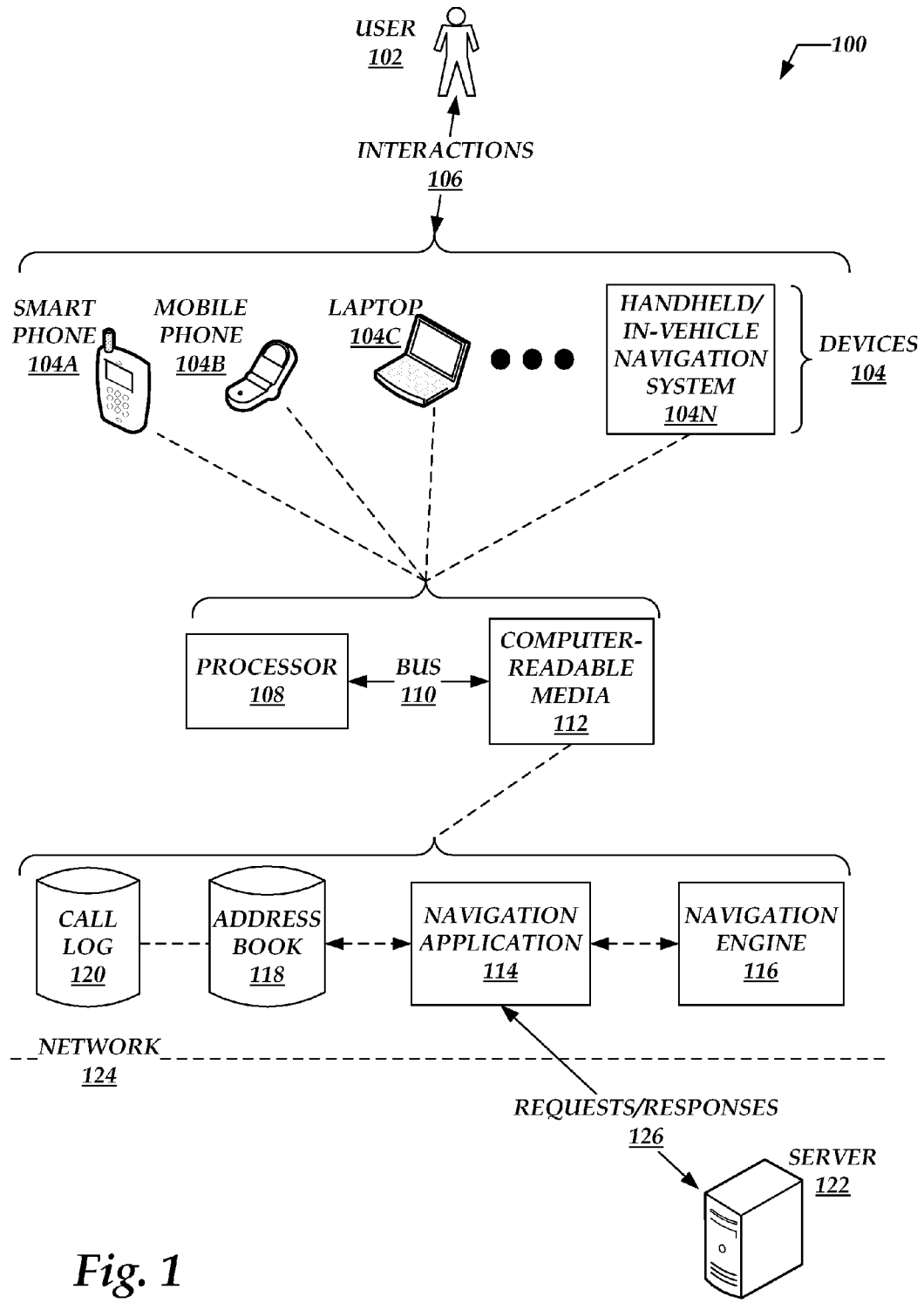
FIG. 1 is a combined block and flow diagram illustrating systems or operating environments for translating search strings into physical locations according to exemplary embodiments.

FIG. 1 illustrates systems or operating environments, denoted generally at 100, for translating search strings into physical locations. These systems 100 may include one or more devices, which may be associated with one or more end users 102. FIG. 1 provides several examples of devices, with these examples including but not limited to: wireless personal digital assistance or "smart" phone 104a; mobile or cellular telephones 104b; portable, notebook, or laptop computing systems 104c with connectivity to wired or wireless communications networks. These examples of devices may also include navigation devices or systems, denoted generally at 104n, that are enabled to interact with global positioning systems (GPSs). These navigation devices 104n may represent handheld GPS units that are relatively portable or mobile, as well as built-in GPS components installed relatively permanently into vehicles (e.g., automobiles, aircraft, watercraft, vessels, or the like).

This description refers to these devices collectively as devices, client devices, or end user devices 104, depending on context. Although FIG. 1 illustrates one example of these different types of devices, implementations of the description herein may include any number of such devices 104. In addition, the graphical elements used in FIG. 1 to depict the server systems are chosen only to facilitate illustration, and not to limit possible implementations of the description herein. However, the description herein also contemplates other forms of end user devices 104, including but not limited to, those shown in FIG. 1.

The users 102 may interact with the devices 104, as represented generally at 106. These interactions are detailed further below in this description, but in overview, generally represent commands or inputs provided by the users 102 to the devices 104, as well as outputs provided by the devices to the users.

Turning to the devices 104 in more detail, these devices may include one or more processors 108, which may have a particular type or architecture, chosen as appropriate for particular implementations. The processors 108 may couple to one or more bus systems 110 chosen for compatibility with the processors 108.

The devices 104 may also include one or more instances of computer-readable storage media 112, which couple to the bus systems 110. The bus systems 110 may enable the processors 108 to read code and/or data to/from the computer-readable storage media 112. The media 112 may represent storage elements implemented using any suitable technology, including but not limited to semiconductors, magnetic materials, optics, or the like. The media 112 may include memory components, whether classified as RAM, ROM, flash, or other types, and may also represent hard disk drives.

The storage media 112 may include one or more modules of instructions that, when loaded into the processor 108 and executed, cause the devices 104 to perform various techniques for translating search strings into physical locations. Physical locations as described herein may be expressed in a variety of ways, including but not limited to street addresses, latitude/longitude (lat/long) coordinates, or other suitable representations or expressions of physical positions or locations. As detailed throughout this description, these modules of instructions may also provide various means by which the devices 104 may participate in the techniques for translating search strings into physical locations, using the components, flows, and data structures described in more detail throughout this description.

As shown in FIG. 1, these modules of instructions may include a navigation application 114, which may be installed into the devices 104 at the time of manufacture, or afterwards. The navigation application 114 may interact with a navigation engine 116, which provides core functionality for communicating with satellites and other components that constitute the GPS.

Turning to the navigation application 114 in more detail, it may receive commands issued by the user 102, as part of the interactions 106. For example, these commands may include the user 102 initiating the navigation application 114 to request directions to a destination location, expressed as a physical location (e.g., a street address) to which the engine 116 may navigate. In some instances, the user 102 may know the destination physical location, which may be stored in an address book 118. In other instances, the destination physical location may be unknown, with the address book 118 containing a name, phone number, or some other information associated with a destination, but not containing a physical location to which the navigation engine may provide directions.

In scenarios in which the destination physical location is not stored on the device 104, the navigation application 114 as described herein may request that whatever information is available on the device (whether stored in the address book 118, a call log 120, or elsewhere), be translated into a representation of a physical location (e.g., a street address, or other suitable representation) to which the navigation engine 116 may navigate. For example, the call log 120 may store a history of calls, whether incoming and/or outgoing from a given device, such as the device 104. However, this call log 120 may store telephone numbers, names, and dates/times of calls, but may not necessarily store street addresses or physical locations associated with callers or callees.

In different possible implementation scenarios, translations to street addresses or physical locations may occur locally on the given device 104, or may be performed by systems or machines remote from the given device. FIG. 1 illustrates scenarios in which one or more remote servers 122 may provide translation services on behalf of one or more of the devices 104. However, FIG. 1 provides these examples only for purposes of providing the present description, but not to limit possible implementations. For example, assuming that the devices 104 possess sufficient processing and storage resources, these devices may perform the translation services locally, with at least some of the functions described herein as informed by the servers 122 being performed locally by the devices 104.

In the example shown, the devices 104 and the remote servers 122 may communicate over one or more intermediate networks 124, which generally represent any protocols, adapters, components, and other general infrastructure associated with wired and/or wireless communications networks. Such networks 124 may be global, regional, local, and/or personal in scope and nature, as appropriate in different implementations.

As shown in FIG. 1, the navigation application 114 may exchange any number of requests and/or responses with the translation services, whether performed locally by the device 104 or remotely by the servers 122. FIG. 1 generally denotes these requests and/or responses at 126, with the subsequent Figures and description elaborating further on these requests and responses.

Having described the overall systems or operating environments 100 for translating search strings into street addresses in FIG. 1, the discussion now turns to a more detailed description of the translation services. This description is now provided with FIG. 2.

Figure 2:
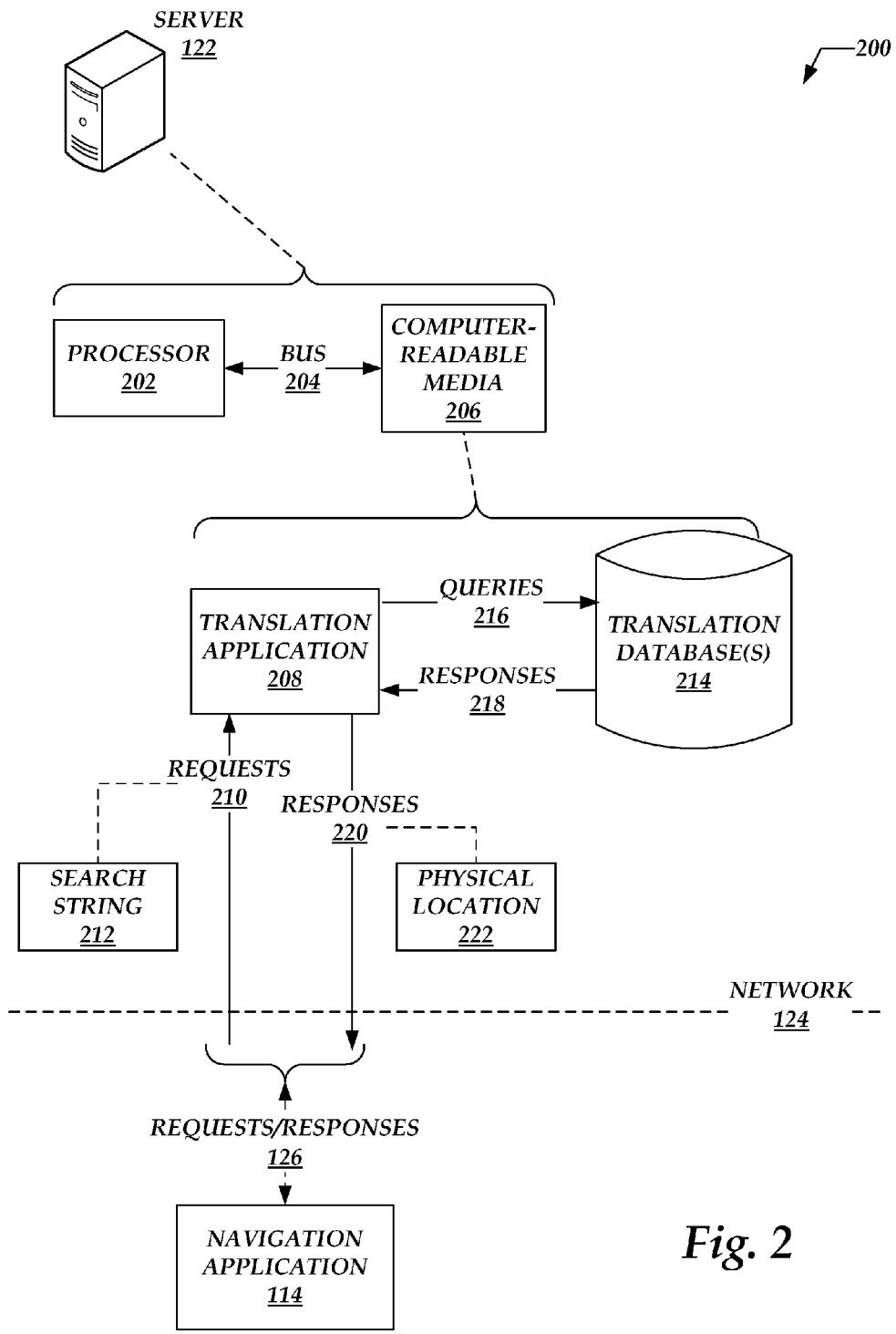
FIG. 2 is a combined block and flow diagram illustrating additional aspects of systems or operating environments for translating search strings into physical locations according to exemplary embodiments.

FIG. 2 illustrates additional aspects of systems or operating environments, denoted generally at 200, for translating search strings into physical locations. More specifically, FIG. 2 illustrates components and data flows relating to translating input search strings into corresponding street addresses or other designations of physical locations.

For convenience of description, but not to limit possible implementations, FIG. 2 may carry forward some items introduced in previous drawings, and may refer to such items by identical reference numbers. For example, FIG. 2 carries forward an example server at 122, and a communications network at 124. In addition, as described previously, the translation services may be performed by the server 122, or may be performed locally by end user devices (e.g., 104 in FIG. 1). The present description elaborates on the former scenario, but also notes that the latter scenario is also possible in some implementations.

Turning to FIG. 2 in more detail, the servers 122 may include one or more processors 202, having type and architecture chosen as appropriate for different implementations of these servers 122. Thus, the type and architecture of the processors 202 in the server 122 may or may not be the same as the processors 108 contained within the devices 104. In addition, the servers 122 may include one or more bus systems 204, which may or may not be of the same type and architecture as the bus systems 110 in the devices 104. The bus systems 204 may enable the processor 202 to communicate with one or more instances of computer-readable storage media 206, with the above description of the media 112 applying generally to the storage media 206.

Turning to the storage media 206 in more detail, it may include one or more modules of computer-executable instructions, which, when executed, cause the server 122 (or the client device 104) to perform any of the translation functions described herein. For example, the storage media 206 may include a translation service or application, denoted generally at 208. The translation application 208 may receive requests for translation services from, for example, the navigation application 114 shown in FIG. 1. In addition, the translation application 208 may respond to such requests, with FIG. 2 carrying forward examples of such requests and responses at 126. In some instances, these requests and/or responses 126 may be communicated over the network 124.

Turning to the requests and responses 126 in more detail, FIG. 2 denotes examples of requests for translation services more particularly at 210. These requests 210 may reference or include one or more input search strings 212, which may represent phone numbers, names, or other types of identifiers as may be stored in address books (e.g., 118) and/or call log records (e.g., 120). Additional examples of the input search strings 212 are provided below. The translation application 208 may receive these requests 210, and may query one or more translation databases 214 to determine whether the input search string 212 maps to a corresponding street address or other physical location. FIG. 2 denotes these queries at 216, and denotes responses to these queries at 218. The responses 218 may indicate that a given search string, such as the search string 212, maps to zero or more physical locations. For example, assuming that the given input search string 212 represents a phone number, the translation databases 214 may determine that the input phone number corresponds to a business or a person located at a given physical location or street address. In this example, the response 218 may include this physical location or street address.

Having received the responses 218 from the translation databases 214, the translation application 208 may return an appropriate response 220 to the navigation application 114. More specifically, the response 220 may include an indication of a physical location to which the input search string mapped. FIG. 2 denotes an example of such a physical location at 222, although it is noted that at least some instances of the responses 220 may indicate that the input search string 212 did not map to any corresponding physical location.

Having described the additional aspects of systems or operating environments 200 for translating search strings into physical locations in FIG. 2, the discussion now turns to a description of process flows for translating search strings into physical locations. This description is now provided with FIG. 3.

Figure 3:
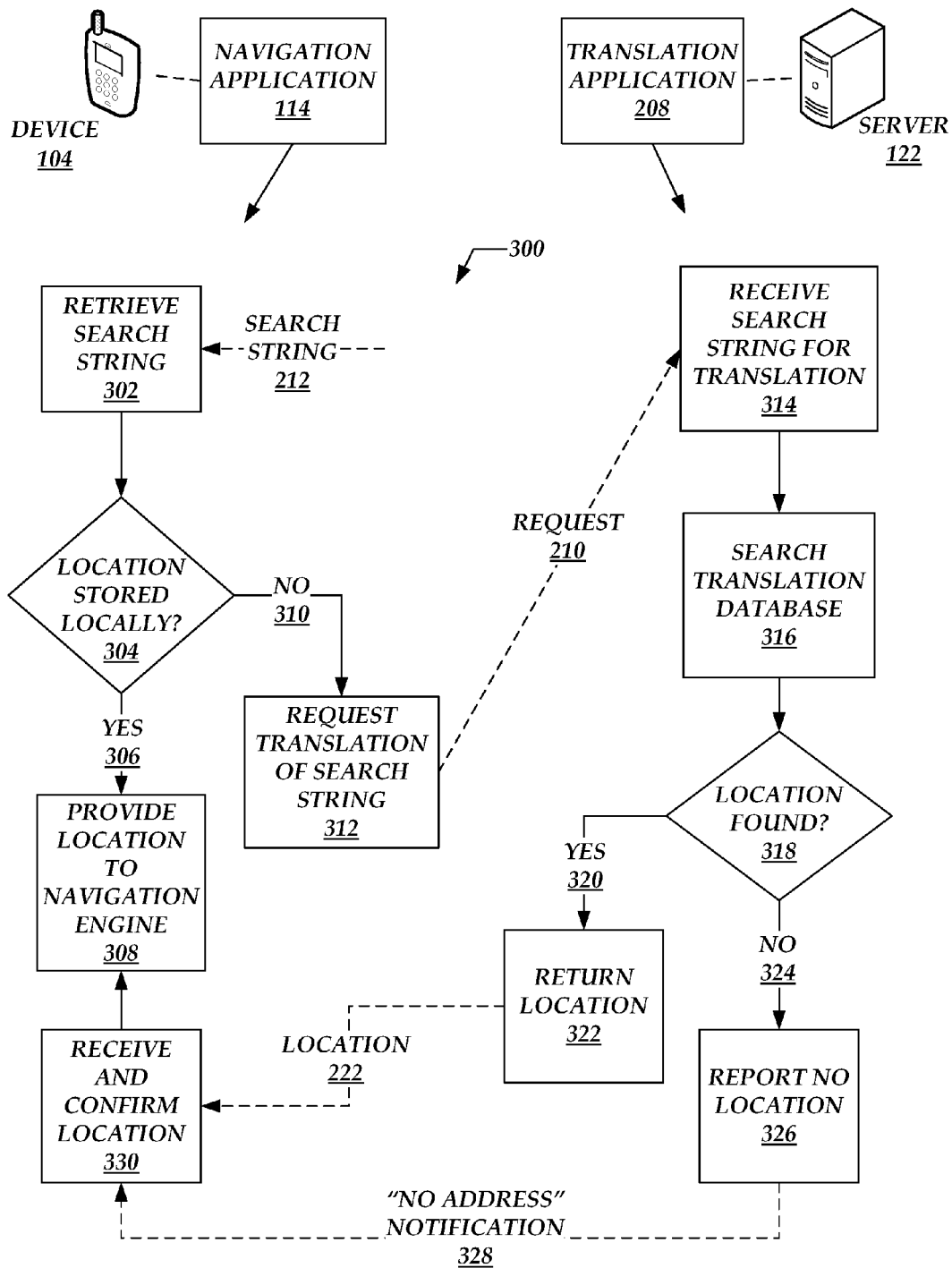
FIG. 3 is a flow chart illustrating processes for translating search strings into corresponding physical locations according to exemplary embodiments.

FIG. 3 illustrates process flows, denoted generally at 300, for translating search strings into corresponding physical locations. For convenience of description, but not to limit possible implementations, FIG. 3 may carry forward some items introduced in previous drawings, and may refer to such items by identical reference numbers. For example, FIG. 3 carries forward an example device at 104, along with the corresponding navigation application 114. In addition, FIG. 3 carries forward an example server at 122, along with the corresponding translation application 208.

In addition, for the purposes of the present description, but not to limit possible implementations, FIG. 3 illustrates certain processing as being performed respectively by the device 104 and the server 122. However, it is noted that implementations of this description may perform at least portions of this processing using other devices, systems, or components, without departing from the scope and spirit of this description.

Turning to the process flows 300 in more detail, beginning at the device 104, for example, block 302 generally represents retrieving one or more search strings for translation into corresponding physical locations (e.g., represented as street addresses or other suitable forms). FIG. 3 carries forward from FIG. 2 an example search string, as denoted at 212. In turn, decision block 304 generally represents determining whether a physical location corresponding to the search string 212 is stored locally at the device 104.

From decision block 304, if the device 104 contains a physical location for the input search string 212, the process flows 300 may take Yes branch 306 to block 308, which represents providing the physical location as input to a navigation engine (e.g., 116 in FIG. 1). For example, the device 104 may associate at least some search strings 212 (e.g., telephone numbers) with corresponding physical locations, as indicated in address books or other data structures (e.g., 118) contained within the device.

Returning to decision block 304, if the device 104 does not contain a physical location corresponding to the input search string 212, the process flows 300 may take No branch 310 to block 312, which represents requesting translation of the input search string to a corresponding physical location. In the example shown in FIG. 3, block 312 may include submitting a request to the remote server 122. However, as described elsewhere herein, a given device, such as the device 104, may also include components and/or processes that provide translation services locally. FIG. 3 carries forward an example request at 210, which may include or refer to one or more input search strings 212.

At the translation application or service 208, which may be hosted remotely at the server 122 or locally at the device 104, block 314 generally represents receiving the input search string 212 for translation. In turn, block 316 generally represents searching one or more translation databases, such as the translation databases 214, for any occurrences of the input search string 212. More specifically, block 316 may include determining whether the input search string 212 maps to any physical locations or street addresses that may be input to a navigation engine (e.g., 116 in FIG. 1).

Decision block 318 represents determining whether the search conducted in block 316 located any instances of the input search string 212 in one or more translation databases, such as the translation databases 214. If the search block 316 mapped the input search string 212 to one or more physical locations (e.g., street addresses), the process flows 300 may take Yes branch 320 to block 322, which represents returning these physical locations to the process that requested translation services (e.g., the navigation application 114). FIG. 3 carries forward an example physical location at 222.

Returning to decision block 318, if the search block 316 did not map the input search string to any physical locations, the process flows 300 may take No branch 324 to block 326, which represents reporting that the input search string 212 did not map to a physical location. For example, block 326 may include generating a "no address" notification message 328, and returning this message to the navigation application 114.

At the navigation application 114, block 330 represents receiving the response from the translation application 208, and reporting the results contained in this response as appropriate. For example, if the response indicates that the input search string 212 mapped to one or more physical locations 222, then block 330 may include receiving these physical locations and confirming them with the user.

In cases in which the input search string 212 maps to only one physical location, block 330 may include prompting the user 102 to confirm that this physical location appears to be valid. If the user 102 confirms the translated physical location, block 330 may include providing this translated physical location as input to a navigation engine (e.g., 116), as represented in block 308. If the user 102 cannot or does not wish to confirm the translated physical location, the process flows 300 may issue an appropriate termination message (not shown in FIG. 3).

In cases in which the input search string 212 maps to multiple (possibly different) physical locations, block 330 may include prompting the user 102 to select and/or confirm one or more of these physical locations as input to the navigation engine 116. If the user 102 confirms or selects one or more of the translated physical locations, block 330 may include providing these physical locations as input to the navigation engine 116, as represented in block 308. If the user 102 cannot or does not wish to confirm any of the multiple translated physical locations for input into the navigation engine 116, the process flows 300 may issue an appropriate termination message (not shown in FIG. 3).

Having described the process flows 300 for translating search strings into corresponding physical locations in FIG. 3, the discussion now turns to a more detailed description of the translation databases (e.g., 214) suitable for use with translating these search strings. This description is now provided with FIG. 4.

Figure 4:
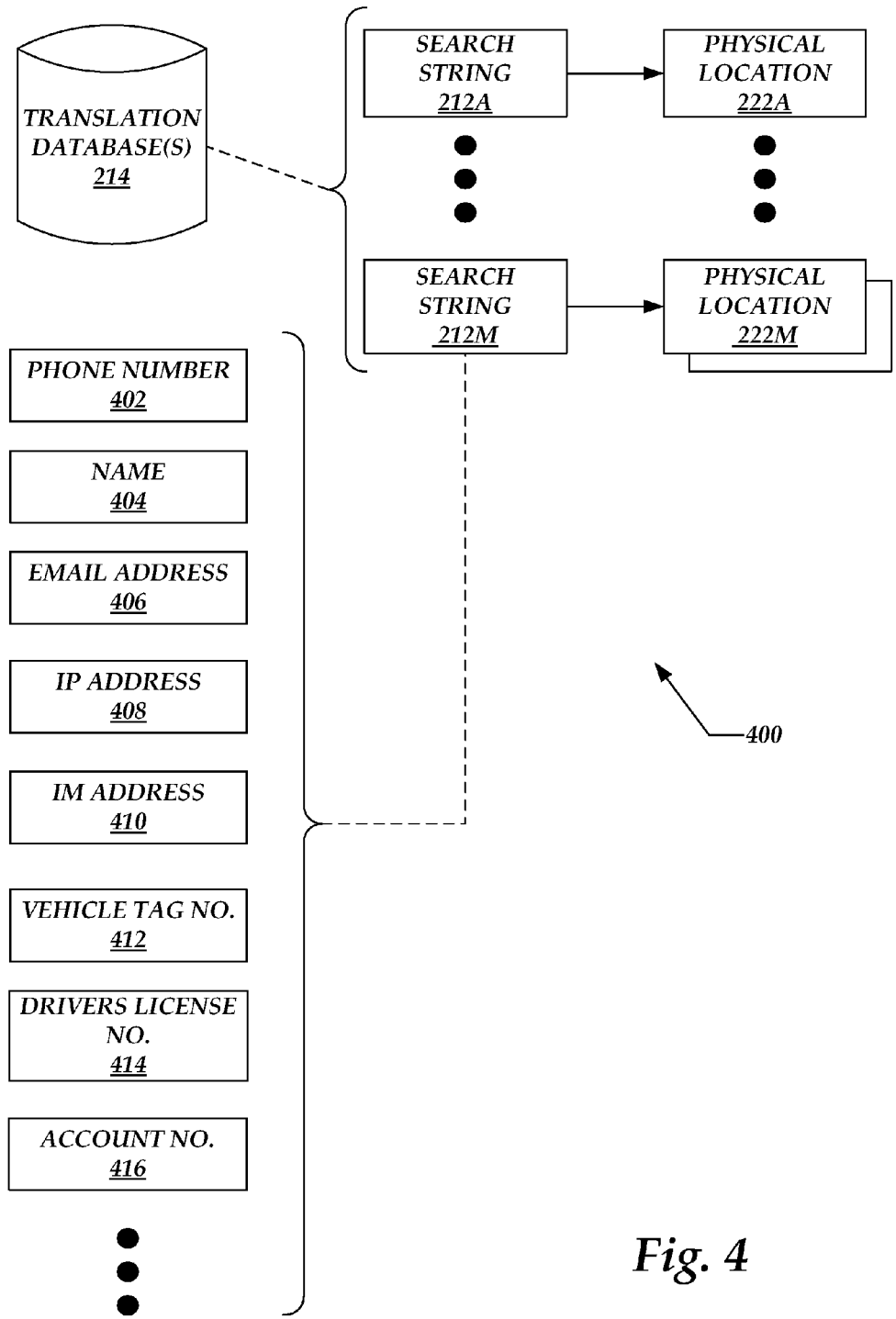
FIG. 4 is a block diagram illustrating data structures suitable for use in connection with translating search strings into physical locations according to exemplary embodiments.

FIG. 4 illustrates data structures, denoted generally at 400, suitable for use in connection with translating search strings into physical locations. For convenience of description, but not to limit possible implementations, FIG. 4 may carry forward some items introduced in previous drawings, and may refer to such items by identical reference numbers. For example, FIG. 4 carries forward an example translation database at 214.

As shown in FIG. 4, the translation databases 214 may include representations of any number of input search strings that may be included in end-user devices (e.g., 104). FIG. 4 provides examples of such input search strings at 212a and 212m. However, it is noted that the translation databases 214 may include an arbitrary number of such input search strings. In addition, although FIG. 4 presents one translation database 214 for clarity and illustration, it is noted that implementations of this description may include any number of translation databases 214.

In general, the one or more translation databases 214 may map or otherwise associate instances of the search strings 212 with one or more representations of street addresses or other physical locations suitable for input into navigation engines. FIG. 4 denotes these representations of street addresses generally at 222a and 222m. However, it is noted that in some cases, a given search string may map or correspond to more than one street address or physical location. In addition, some possible input search strings 212 may not occur in any of the translation databases 214. In these latter cases, the translation databases 214 would not map these input search strings to any physical location, as previously described.

Turning to the search strings 212 in more detail, FIG. 4 illustrates several non-limiting examples of these search strings 212, with the understanding that implementations of this description may contain other search strings 212 without departing from the scope and spirit of this description. In general, examples of the search strings 212 may include any information storable within an address book, contact list, call log, or other similar data structure contained within a given end-user device (e.g., 104). For example, the search strings may include representations 402 of telephone numbers, which may include landline telephone numbers, cellular telephone numbers, satellite telephone numbers, and the like.

Examples of the search strings may also include representations 404 of names, titles, or other identifiers associated with particular persons. This name information may appear in, for example, an address book or other contact list structure contained within a given end-user device (e.g., 104 in FIG. 1). The name representations 404 may be arranged to store alphanumeric information as appropriate in different implementations.

The search strings 212 may also include representations of network-related addresses, including but not limited to, representations 406 of e-mail addresses, or representations 408 of Internet protocol (IP) addresses. The search strings may also include representations 410 of addresses, names, or identifiers as defined and recognized by clients or applications that enable communications via instant messaging (IM), text messaging, short message service (SMS), or other similar services.

Examples of the search strings 212 may also include representations 412 of vehicle tag numbers, plate numbers, registration numbers, or the like. The search strings 212 may also include representations 414 of drivers' license numbers, or other similar government-issued permits, certificates, identification documents, or the like.

These search strings may also include representations 416 of various account numbers associated with particular persons. Examples of such account numbers may include Social Security Numbers (SSNs) as may be issued by the United States government. Other examples of such account numbers may include credit card numbers, taxpayer or employer identification numbers, or the like. For businesses or other corporate enterprises, these account numbers may include identifiers assigned by agencies that provide research services related to such businesses or enterprises.

Turning to the physical locations 222 in more detail, these physical locations may take any type and format as appropriate for input to navigation engines (e.g., 116). Generally, the tools described herein may operate with any number of navigation engines provided by different vendors, with these different navigation engines possibly supporting different input formats. Accordingly, the translation databases 214 may store representations of physical locations (e.g., street addresses) as appropriate for input into any number of different navigation engines, or may convert these representations as appropriate for input into the different engines.

The subject matter described herein may be practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices.

Based on the foregoing, it should be appreciated that apparatus, systems, methods, and computer-readable media for translating search strings into street addresses are provided herein. Although the subject matter presented herein has been described in language specific to computer structural features, methodological acts, and computer readable media, it is to be understood that the subject matter defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the claimed subject matter, which is set forth in the following claims.

What is claimed is:

1. A non-transitory computer-readable storage medium having computer-executable instructions stored thereon which, when executed by a computer, cause the computer to perform a method comprising:

receiving a search string for translation into a physical location, wherein the search string is received from a call log of a mobile device;

searching a plurality of representations of search strings for the search string received, the plurality of representations of search strings associated with physical locations;

in response to locating the search string in the plurality of representations of search strings, determining the physical location associated with the search string, the physical location corresponding to a location of an entity represented by the search string; and providing the physical location as input to a navigation engine for navigating to the location of the search string.

2. The non-transitory computer-readable storage medium of claim 1, wherein the search string comprises a telephone number and wherein the physical location corresponding to the location of the search string comprises a street address.

3. The non-transitory computer-readable storage medium of claim 1, wherein the search string comprises a telephone number.

4. The non-transitory computer-readable storage medium of claim 1, wherein the search string comprises a name associated with a caller.

5. The non-transitory computer-readable storage medium of claim 1, wherein the plurality of representations of search strings are stored remote from the computer and accessible over a communications network.

6. The non-transitory computer-readable storage medium of claim 1, further comprising instructions which, when executed by the computer, cause the computer to perform a method comprising:

determining that the search string is associated with a plurality of physical locations; and providing a prompt to a user to select one of the plurality of physical locations as input to the navigation engine.

7. A computer-implemented method for converting a search string into a physical location, the method comprising:

receiving the search string for translation to the physical location, wherein the search string is received from an address book of a mobile device;

searching a plurality of representations of search strings for the search string received, the plurality of representations of search strings associated with physical locations;

in response to locating the search string in the plurality of representations of search strings, determining the physical location associated with the search string, the physical location corresponding to a location of an entity represented by the search string; and providing the physical location as input to a navigation engine for navigating to the location of the entity represented by the search string.

8. The method of claim 7, wherein the search string comprises a telephone number and wherein the physical location comprises a street address.

9. The method of claim 7, wherein the search string comprises an e-mail address.

10. The method of claim 7, wherein the search string comprises a name.

11. The method of claim 7, wherein the search string comprises an account number.

12. The method of claim 7, wherein the search string comprises a network address.

13. The method of claim 7, further comprising:

determining that the search string is associated with a plurality of physical locations; and providing a prompt to a user to select one of the plurality of physical locations as input to the navigation engine.

14. A device comprising:

a processor; and a memory for storing a program containing computer-executable instructions for converting a search string into a physical location that, when executed by the processor, cause the processor to perform a method comprising:

receiving the search string for translation into the physical location, wherein the search string is received from an address book of a mobile device, searching a plurality of representations of search strings for the search string received, the plurality of representations of search strings associated with physical locations, in response to locating the search string in the plurality of representations of search strings, determining the physical location associated with the search string, the physical location corresponding to a location of an entity represented by the search string, and providing the physical location as input to a navigation engine for navigating to the location of the search string.

15. The device of claim 14, wherein the device includes the navigation engine.

16. The device of claim 14, wherein the search string comprises an account number.

17. The device of claim 14, wherein the search string comprises an e-mail address.

18. The device of claim 14, wherein the plurality of representations of search strings are stored on a server remote from the device.

19. The device of claim 14, wherein the search string comprises a phone number.

20. The device of claim 14, wherein the search string comprises a network address.

21. The device of claim 14, wherein the search string comprises a name associated with a caller.

* * * * *